May 17, 1960 A. N. LEHBERGER 2,937,263

TELEPHONE DIAL ILLUMINATOR

Filed March 6, 1958 2 Sheets-Sheet 1

INVENTOR
Arthur N. Lehberger

BY L. S. Saulsbury

ATTORNEY

INVENTOR
Arthur N. Lehberger
BY L. S. Saulsbury
ATTORNEY

United States Patent Office 2,937,263

Patented May 17, 1960

2,937,263

TELEPHONE DIAL ILLUMINATOR

Arthur N. Lehberger, Union, N.J.

Application March 6, 1958, Serial No. 719,549

3 Claims. (Cl. 240—2.17)

This invention relates to a telephone dial illuminator.

It is the principal object of the present invention to provide a self-contained telephone dial illuminator that can be supported by gravity in the cradle bracket of the telephone stand and without need of screws or special wiring.

It is another object of the invention to provide a telephone dial illuminator which is battery operated and in which the batteries can be easily replaced by mere separation of two component parts and replacing the batteries therein.

It is still another object of the invention to provide a telephone dial illuminator in which the switch for turning on the lamp bulb is accessible from the top of the illuminator and can be depressed by resting the handset thereupon with one to turn on the light and leaving the other hand free for dialing whereby the illuminator will be operated only at the will of the user so that the batteries are not prematurely used up, once the dial has been used the light will be extinguished automatically when the handset is lifted to the head of the user.

It is a further object of the invention to provide a telephone dial illuminator in which the bulb supporting and switch parts are the battery terminal leads and are easily fitted into the body of the illuminator and whereby to minimize the number of parts required to form the illuminator.

Still further objects of the invention are to provide a telephone dial illuminator which is of simple and practical construction, inexpensive to manufacture, easy to assemble, neat and attractive in appearance, compact, durable, and easy to install upon the telephone stand, and efficient and effective in use.

Figures 1, 2, 3, 4, 5:
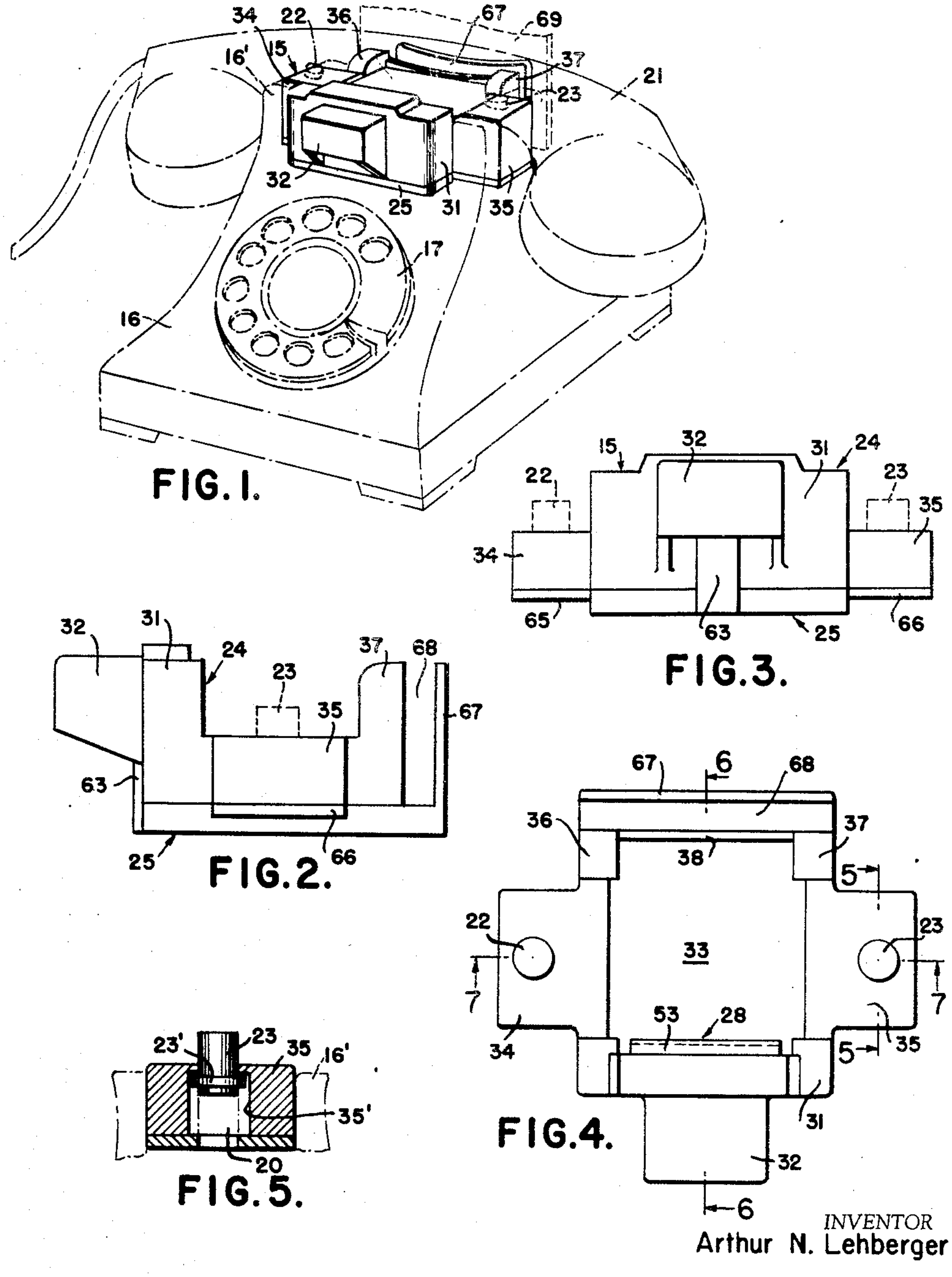
Figures 6, 7, 8, 9, 10, 11, 12, 13, 14:
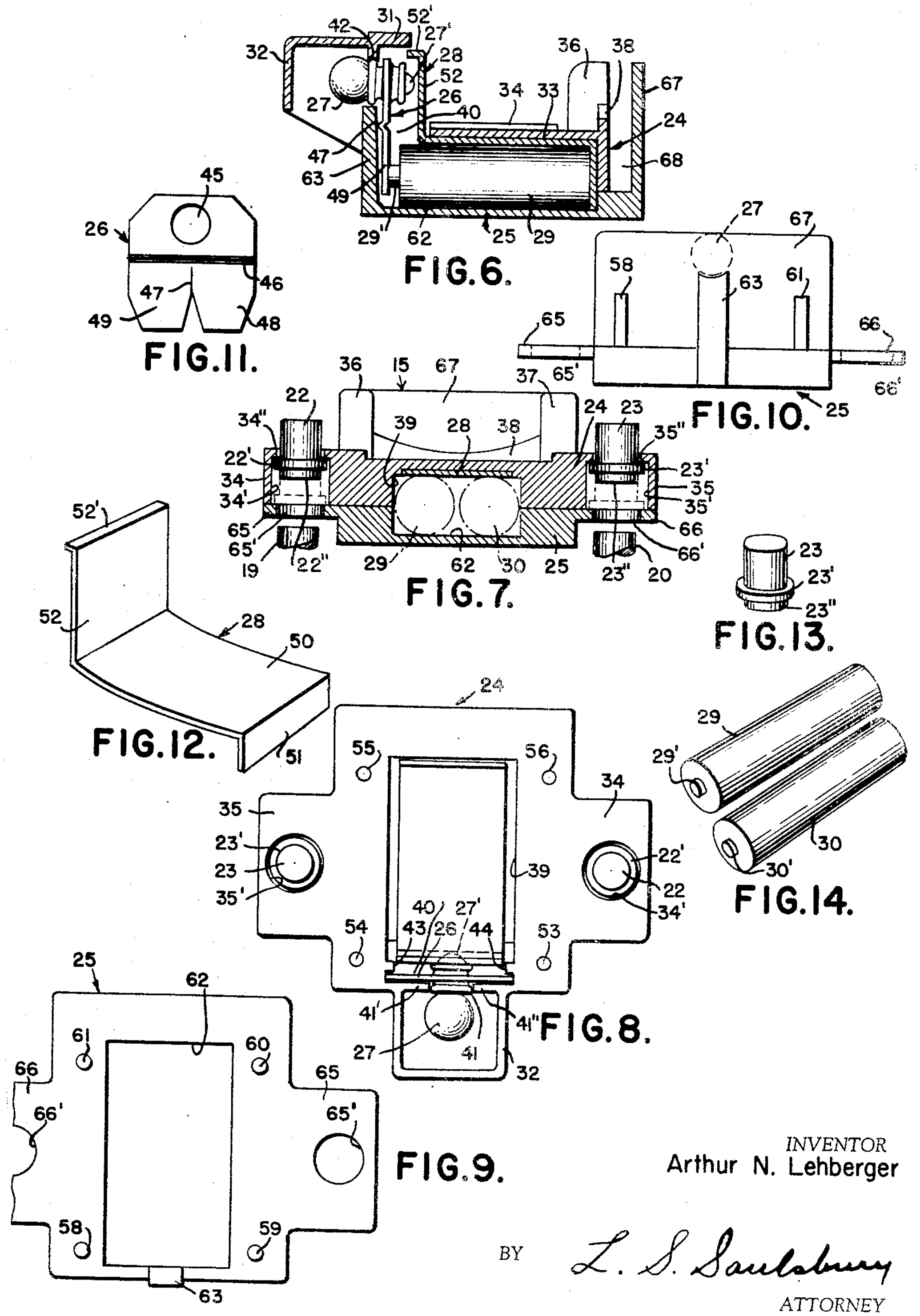

For a better understanding of the invention, reference may be had to the following detailed description taken in connection with the accompanying drawing, in which:

Figure 1 is a perspective view of the telephone dial illuminator disposed in the cradle bracket of the telephone stand, Fig. 2 is a side elevational view of the illuminator, Fig. 3 is a front elevational view, Fig. 4 is a top plan view, Fig. 5 is a transverse sectional view taken on line 5—5 of Fig. 4 and through the guide pin opening with illustration made as to the manner in which the guide pins are maintained in the elevated position by the telephone stand press buttons, Fig. 6 is a longitudinal sectional view taken on line 6—6 of Fig. 4, Fig. 7 is a transverse sectional view taken on line 7—7 of Fig. 4, Fig. 8 is a bottom plan view of the upper body part and of the bulb supporting and switch parts therein, Fig. 9 is a top plan view of the lower body part, Fig. 10 is a front elevational view of the lower body part, Fig. 11 is an elevational view of a bulb supporting and battery contact plate part, Fig. 12 is a perspective view of a switch and battery contact, Fig. 13 is a perspective view of one of the press button extensions, and Fig. 14 is a collective and perspective view of the small batteries used in the illuminator.

Referring now to the figures, 15 represents generally the telephone dial illuminator embodying the features of the invention. This illuminator is so shaped and formed as to be supported in cradle bracket 16′ of a telephone stand 16 having a dial 17. The illuminator is held in cradle bracket against lateral displacement therein by the press buttons 19 and 20 of the cradle bracket. The illuminator has press button extensions 22 and 23 which are respectively vertically aligned with the press buttons 19 and 20 of the cradle bracket and will be elevated by the buttons out of the illuminator 15 as best illustrated in Figs. 1 and 3 in order that the handset 21 when rested upon the illuminator will depress the extensions 22 and 23 of the illuminator.

The illuminator 15 consists only of upper and lower body parts 24 and 25, a bulb-supporting and battery contact plate 26, a lamp bulb 27, a switch and battery contact 28 and two small flashlight batteries 29 and 30.

The upper body part has an upstanding front portion 31 with a lamp bulb hood extension 32 extending forwardly therefrom. In rear of the upstanding portion 31, is a cover portion 33 having oppositely-extending wing portions 34 and 35 which respectively support guide pins 22 and 23. The press button extensions 22 and 23 have respectively guide flanges 22′ and 23′ that lie respectively within recesses 34′ and 35′ and engage respectively with shoulder openings 34″ and 35″ to prevent the extensions 22 and 23 from leaving the respective wing portions 34 and 35. The handset 21 when placed on the illuminator will depress the press button extensions 22 and 23 and the cradle press buttons 19 and 20. The extensions 22 and 23 are normally held in their elevated positions by the press buttons 19 and 20. On the rear of the upper body part 24 are laterally-spaced raised portions 36 and 37 with a low wall 38 extending between them. These raised portions are rearwardly spaced from the front portion and between these front and rear portions the handset will be accommodated.

In the underside of the upper body part 24 is a recess 39 for accommodating switch and battery contact 28. Within the front portion 31 and extending upwardly from the recess 39 is a vertically-extending opening 40 that opens the rear of the upstanding portion 31. In the front portion is a vertically-extending slot 41 with guide edges 41′ and 41″ that extend from the lower edge of the front portion upwardly to provide a shoulder 42 against which bulb 27 can be brought to rest while lying under the hood extension 32. Within the opening 40 and projecting laterally from the sides of the recess 39 are guide shoulders 43 and 44 to retain the bulb-supporting and battery contact plate 26.

Plate 26 has a bulb opening 45 and a laterally-extending stiffening rib 46. Below the rib 46 the plate 26 is vertically slit at 47 to provide depending spring fingers 48 and 49. The plate 26 is tightly held in place in front of the shoulders 43 and 44 and within the front portion 31.

The switch and battery contact 28 has downwardly-sprung contact portion 50 adapted to fit within the recess 39 in the bottom of the upper part 24 and a drop rear stop portion 51. Extending upwardly through the opening 40 is a switch arm portion 52 that has a reinforcing top edge flange 52′. This switch arm portion 52 is adapted to engage with a terminal 27′ of the bulb 27 to close the circuit to the lamp bulb and batteries 29 and 30. The respective batteries 29 and 30 have respectively positive terminals 29' and 30' that respectively engage finger projections 48 and 49 of the bulb supporting and contact plate 26. The portion 52 will be depressed with a finger or by resting the lower end of the handset upon the illuminator to cause the lamp bulb 27 to be lighted. This will be done while the user dials the telephone with the other hand. The light from the lamp bulb 27 is directed by the hood extension 32 over and toward the dial 17 of the telephone stand 16.

Extending upwardly from the bottom face of the upper body part 24 are small holes 53, 54, 55 and 56 adapted to receive respectively in a tight fitting manner pins 58, 59, 60 and 61 respectively which will secure the lower body part 25 to the upper body part 24.

The lower body part 25 has a recess 62 corresponding to the recess 39 of the upper body part 24 and within the joined recesses the batteries 29 and 30 are forced to straighten and make contact with the spring portion 50 of the switch and battery contact 28. An upstanding projection 63 on the front of the lower body part 25 is projected upwardly in the vertical slot 41 of the upper part 24 and will support the bulb 27 against the slot shoulder 42. With the lower part 25 secured upon the upper part, the battery contact plate 26, the contact 28, the bulb 27 and the batteries 29 and 30 will be tightly fitted and held in place without the necessity of having to use screws to secure the parts together.

The lower body part 25 has wing portions 65 and 66, respectively having openings 65' and 66' to accommodate respectively the press buttons 19 and 20 of the telephone stand. These openings 65' and 66' are respectively of less diameter than the openings 34' and 35' of the wing portions 34 and 35 of the upper body part 24. The respective pins 22 and 23 respectively have portions 22'' and 23'' lying below the respective flanges 22' and 23' that will enter openings 65' and 66' while the flanges 22' and 23' will rest upon the wing portions 65 and 66 thereby to hold the pins 22 and 23 against displacement from the bottom of the illuminator.

The lower body part 25 has an upstanding rear wall 67 that is spaced from the raised portions 36, 37 and the rear wall 38 of the upper body part 24 to provide a pocket 68 into which a business card 69 may be rested.

In use, after the parts have been assembled in the manner above described the telephone dial illuminator is simply placed in the cradle bracket 16' of the telephone stand 16 and with the press buttons 19 and 20 of the telephone stand projected through openings 65' and 66' of the lower body part 25 so that the illuminator is held thereby against lateral displacement at all times within cradle bracket and against vertical displacement by its gravity weight. The handset 21 is supported upon the illuminator in the same manner as it is supported in the bradle bracket. The press button extensions 22 and 23 will be elevated by the press buttons 19 and 20 and when the handset is placed upon the illuminator they will be depressed in the same manner as the press buttons are depressed by the handset. The operation of the telephone is not effected in any way by this illuminator.

When the handset 21 is lifted the lower end of the same can be pressed against the upstanding portion 52 of the switch contact 28 to establish a contact with the terminal 27' of the bulb 27. While this is being done, the user can dial the telephone with the other hand.

It should now be apparent that there has been provided a convenient and self-contained dial illuminator that can be fitted and installed upon the telephone without the need of special screws or tools and without special wiring requirements.

It should also be apparent that the illuminator is held wholly within the cradle bracket by gravity. The use of the telephone is not in any way impeded by the illuminator.

While various changes may be made in the detail construction, it shall be understood that such changes shall be within the spirit and scope of the present invention as defined by the appended claims.

What is claimed is:

1. A self-contained telephone dial illuminator adapted to be supported in the cradle of a telephone stand comprising a body assembly, lamp bulb, contacts and batteries disposed within the assembly, said body assembly having upstanding portions longitudinally-spaced a distance from one another to retain a telephone handset, said body assembly further having laterally spaced openings for receiving spaced press buttons of the telephone stand to hold the illuminator within the cradle of the telephone stand against lateral displacement thereover and press button extensions respectively vertically adjustable in said laterally spaced press button openings and projected upwardly from the openings by the telephone press buttons so as to be depressed by the telephone handset when rested upon the illuminator.

2. A telephone dial illuminator comprising separable upper and lower body parts respectively having cooperating recesses and outwardly extending wing portions with openings therein, said lower part adapted to rest in a telephone bracket and the openings of wing portions respectively being spaced to be vertically aligned with and receive the telephone press buttons of the telephone stand, press button extensions movable in the openings in the wing portions and engageable by the telephone press buttons, said upper part having an opening extending upwardly from its recess contacts fitted into the recess and the opening in the upper part and extended out of the recess through the opening, a lamp bulb carried by one of the contacts, the other contact having a switch arm which can be depressed against the lamp bulb and batteries disposed within the recesses of said body parts and engaging the contacts.

3. A telephone dial illuminator as described in claim 2, and said upper body part having a front portion and said opening thereof lying therein and open at the rear of the front portion, said front portion having a vertically-extending guide slot with a stop shoulder at the upper end thereof, said guide slot receiving the lamp bulb, said bottom part having a projection extended upwardly into the vertical slot of the upper part to support and retain the bulb against the shoulder thereof, said switch arm being accessible from the rear of the front portion to close the lamp and battery circuit.

References Cited in the file of this patent

UNITED STATES PATENTS

| | | |
|---|---|---|
| 1,894,235 | Farmer | Jan. 10, 1933 |
| 1,959,572 | Craig | May 22, 1934 |
| 2,560,653 | Laporte | July 17, 1951 |